United States Patent Office 3,250,634
Patented May 10, 1966

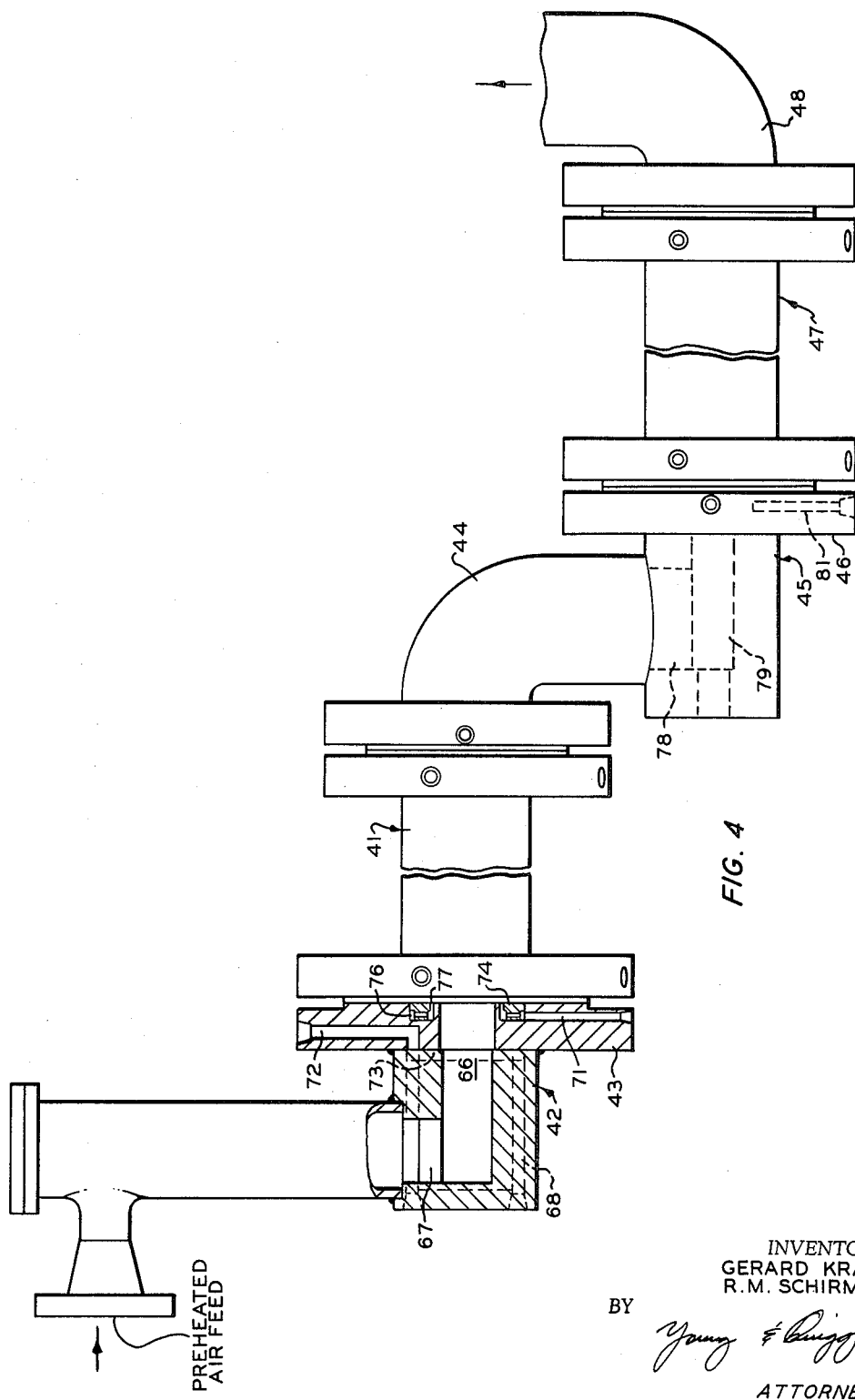

3,250,634
PROCESS AND APPARATUS FOR PRODUCING ACIDIC CARBON BLACK
Gerard Kraus and Robert M. Schirmer, Bartlesville, Okla., assignors to Phillips Petroleum Company, a corporation of Delaware
Filed May 18, 1962, Ser. No. 195,765
10 Claims. (Cl. 106—307)

This invention relates to the production of carbon black. In one aspect it relates to a process for continuously producing an oxidized carbon black. In another aspect it relates to apparatus for producing oxidized carbon black. In another aspect it relates to improved carbon black produced by a process which comprises continuously partially quenching the produced carbon black and oxidizing the partially quenched product.

When carbon black first became important in compounding rubber, the major portion of the total carbon black produced was manufactured by the channel process wherein natural gas was burned in a deficiency of oxygen and the resultant flame caused to impinge upon a cool surface to deposit the carbon formed thereupon. Channel blacks produced by this and other similar processes are characterized by low pH's and are well suited for some specific applications in compounding rubber. However, the methods of producing channel black are undesirably inefficient and require extensive equipment.

For these and other reasons, the furnace process has come into prominence and widespread usage for making carbon black using gas or liquid hydrocarbon feed and makes possible the production of large quantities of carbon black at high yields. The properties of this type of carbon black are superior to channel blacks for some uses, but inferior for certain other uses. Furnace blacks are usually characterized by an alkaline pH, greater than 7, while channel blacks have an acid pH, usually less than 6.

It has been established that carbon blacks can be beneficiated in one way or another by treating them at elevated temperatures in the presence of gaseous oxygen. Such treatment is believed to add carbon-oxygen complexes to a greater or lesser extent to the carbon black surface, which in turn effects a reduction in pH of the carbon black. Such surface oxidation can be carried out with both channel and furnace blacks but is particularly advantageous when performed on oil furnace blacks. Carbon blacks which have been so treated and which have been decreased in pH have greater utility as rubber reinforcement. The low pH material produced by the oxidation also shows improved pigmentation properties such as improved or intensified color, length, flow, iridescence, tinting strength, etc. when used in non-rubber reinforcing applications. By the practice of our invention, oil furnace blacks are produced having pH values in the range of that for channel blacks, that is, having pH values of less than 6. Throughout this application, when pH values of black are referred to, the pH of a suspension of carbon black and water, determined by the method of ASTM D512-60, is meant.

U.S. Patent No. 2,682,448 shows that loose or pelleted carbon black can be air treated in a rotating cylinder at elevated temperatures. Such treatment is effective although it requires an additional and separate treating operation.

An object of our invention is to produce acidic carbon black.

Another object of our invention is to produce acidic oil furnace carbon black in a continuous process.

Another object of our invention is to produce acidic oil furnace carbon black under closely controlled conditions without over-treatment.

Another object of our invention is to produce acidic oil furnace carbon black with greater convenience and economy.

Another object of our invention is to produce improved carbon black.

Other aspects, objects and advantages of our invention are apparent in the written description and the drawing and the claims.

According to our invention acidic carbon black is produced by heating a hydrocarbon reactant in a reaction zone to produce carbon black, partially quenching the reaction products and passing the partially quenched products into an oxidizing zone and contacting with an oxidizing agent. Preferably the pressure in the reaction and oxidizing zones is maintained in the range of 8–30 atmospheres. Heat is added in the reaction zone to maintain a temperature in the range of 2000–3300° F. The temperature of the products after the partial quench is in the range of 800–1800° F., preferably in the range of 1200–1500° F. For best results, the temperature of the partially quenched product should be from approximately the ignition temperature of the products to 300° F. below the ignition temperature. The residence time in the reactor is in the range of about 5 to about 400 milliseconds while the residence time in the oxidizer preferably is in the range of 15–50 milliseconds.

Also according to our invention there is provided apparatus for producing acidic carbon black comprising a reactor, means to feed a hydrocarbon reactant continuously into the reactor, means to add heat continuously to the reactor to produce carbon black, means to partially quench the reaction products, an oxidizing chamber, means to feed the partially quenched reaction products into the chamber, means to feed an oxidizing agent into the chamber and means to contact the partially quenched products with the oxidizing agent in the oxidizing chamber. Means are provided for controlling the pressure in the reactor by metering the gas flow out of the system while the residence time (flow) is controlled by metering the air into the system. The temperature is controlled in critical zones by the amount of quenching liquid added.

Further, according to our invention, a novel carbon black is produced.

In the drawing FIGURE 1 is a schematic elevation partially in cross section of apparatus comprising a carbon black reactor and a carbon black oxidizer.

FIGURE 4 illustrates apparatus used to test our invention.

FIGURE 5 is a detail view of a portion of FIGURE 4.

Figure 1:
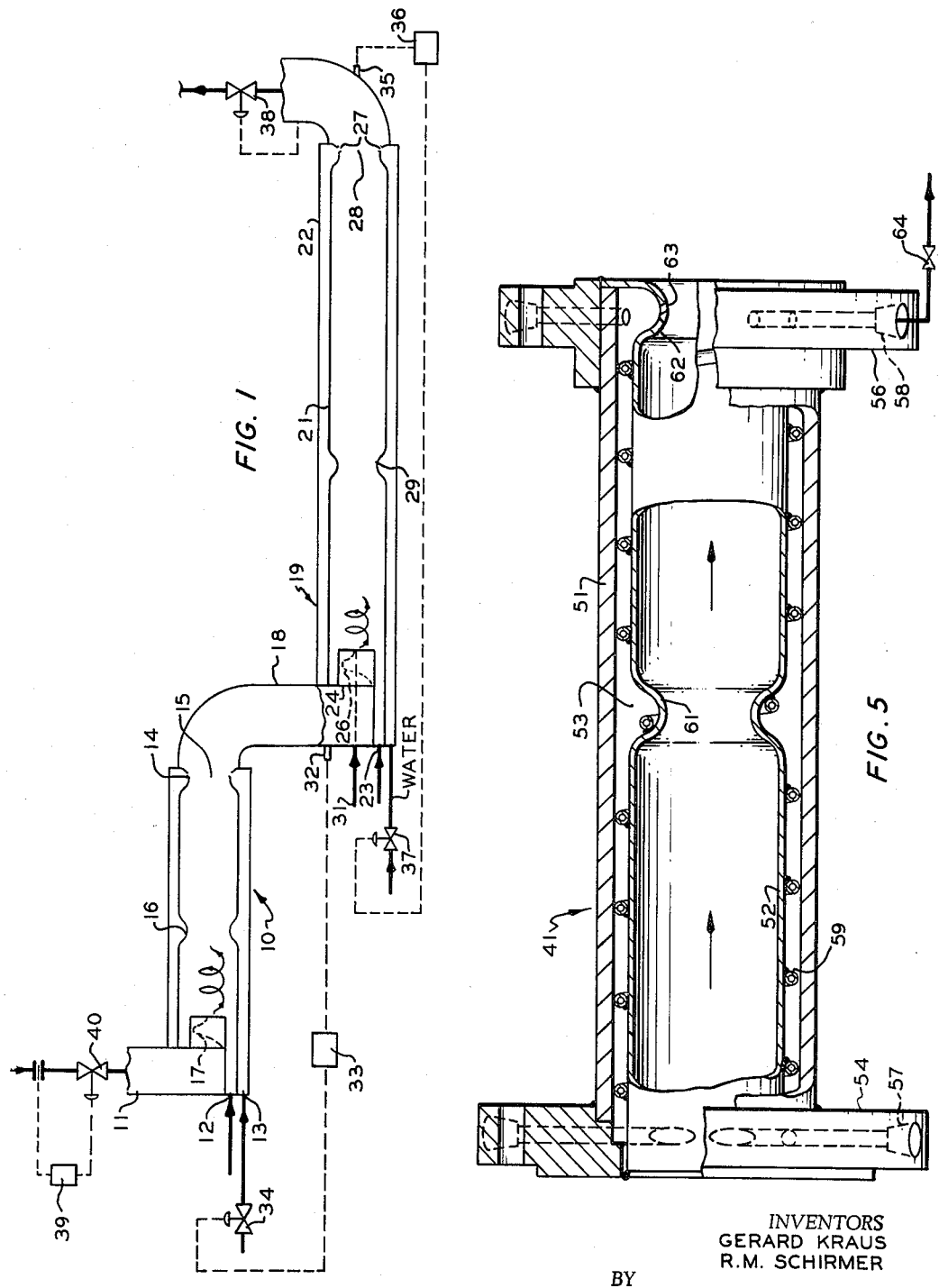

In the apparatus of FIGURE 1, a reactor 10 is provided with an oxidant inlet 11, a hydrocarbon inlet 12, and a quench fluid inlet 13 near one end, and quench injection ports 14 and an outlet 15 at the other end. Preferably reactor 10 is provided with a restriction 16 at a mid-point. A hydrocarbon is injected annularly into reactor 10 and proceeds longitudinally along the cylindrical wall thereof, while air is injected through inlet 11 and, through the influence of vanes 17, enters the reaction space as a swirling axial core. Additional mixing of the hydrocarbon and the air occurs as the stream passes restriction 16 (if provided) and the reaction continues in more turbulent conditions through the remainder of the reactor. Sufficient quench liquid, preferbly water, is injected through ports 14 to lower the temperature of the reaction products sufficiently to stop the production of carbon black. The reaction products then proceed through conduit 18 to oxidizer 19.

Oxidizer 19 comprises an inner, generally cylindrical shell 21, and an outer generally cylindrical shell 22, an annular inlet 23 for oxidant, an axial inlet 24 provided with vanes 26, quench injection ports 27 and outlet 28. The partially quenched reaction products pass through conduit 18 and enter oxidizer 19 through axial inlet 24 and are given a swirling motion by vanes 26. Additional oxidant, preferably air, enters annularly through inlet 23. Thus, the air is flowing horizontally along the wall of the chamber while the reaction products spiral through the chamber as a rotating core within the annulus of air. The oxidation is effected at the highly turbulent shear interface between the fuel, and the air, and therefore the carbon black is oxidized near the periphery of the reactor wall, in the mixing zone at the interface. Preferably a restriction 29 is provided and at this point the reaction mixture is forced into increased turbulence and the oxidation is completed in the succeeding portion of the chamber. Quench liquid, preferably cooling water, enters the jacket formed between outer shell 22 and inner shell 21, cools the walls of inner shell 21, and is metered through quench injections port 27 to stop the oxidation. If desired, quench water also can be added through a pipe 31 to augment or replace the partial quench added in quench injection ports 14. The effluent from the oxidizer, containing the carbon black product, quench steam and reaction by-products, leaves at outlet 28, proceeds through a pressure control valve 38 and through conventional separation, bagging and venting units (not shown).

Suitable control means can be provided. For example, the temperature of the partially quenched stream can be controlled by means of a temperature probe 32 and a controller 33 regulating the flow of quench fluid by means of motor valve 34. Similarly, the temperature of the discharge stream can be controlled by temerature probe 35, controller 36, and motor valve 37. The pressure in the system can be controlled by a back pressure valve 38. The residence time can be controlled by a flow controller 39 regulating valve 40 in the air inlet line. If desired, the reactants can be fed as an automatically controlled ratio of the air.

Preferably reactor 10 is made according to the disclosure in the copending application Serial No. 195,764, filed May 18, 1962, of R. M. Schirmer and E. H. Fromm and which is operated under superatmospheric pressure. However, more conventional furnace black reactors also can be used. For example, the refractory lined apparatus disclosed by Krejci in U.S. Patent No. 2,616,795 can be utilized successfully.

The present invention is a unitized carbon black process which is capable of producing carbon black having the low pH and improved performance characteristics. The invention eliminates two operations previously required with obvious advantages of greater convenience and economy.

The hydrocarbon fuel is carbonized in a reaction zone with a residence time of about 40 milliseconds at about 2800° F. It is then partially quenched with water to reduce the temperature to about 1500° F. and passed into a zone where contact with additional oxygen takes place with a residence time in that zone of about 30 milliseconds. The stream containing the low pH carbon black is then separated from volatile by-products and bagged in the conventional manner.

The hydrocarbon feed can be sprayed or atomized into the reactor by any conventional metering device and usually is preheated by any convenient means such as gas fired or electrical heat exchangers to a temperature which is generally about 30–90 percent of the boiling point of the hydrocarbons. Under typical conditions a substantial portion of the hydrocarbon enters the first reaction zone in the vapor state. The hydrocarbon temperature can vary to a great extent, particularly with unusually low or high boiling fuels, the only essential requirement being that it arrive in an ignitable condition in the combustion zone. The flow rate varies with other conditions such as the size of the reactor, the reactor temperature, and the reactor pressure. With the apparatus of FIGURE 1 operating 15 atm. and about 2800° F., and wherein reactor 10 is one foot long and two inches in diameter, the fuel rate varies from 50 to 300 lbs./hr.

Figure 2:
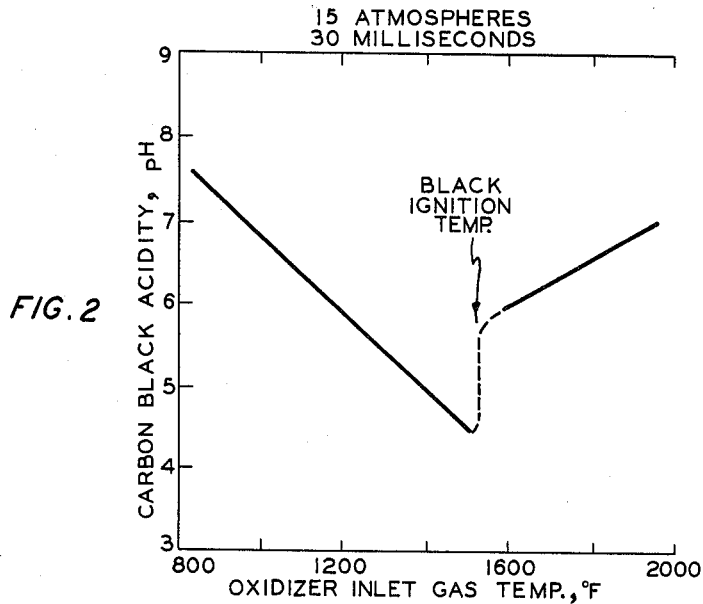
FIGURE 2 is a graph illustrating the variation in pH of the treated black with oxidizer inlet temperature.

The reaction air can be pumped and preheated by any convenient means such as a rotary pump and an electrical or gas fired heat exchanger to a temperature of about 700–2000° F. and preferably to about 1000–1200° F. The spirally rotating motion may be effected by the use of one or more tangentially located ports, such as shown in FIGURE 2, or by the use of suitable louvers or vanes such as that used in the apparatus of FIGURE 1 which are capable of imparting the desirable air rotation within the carbonization reactor. The initial hydrocarbon/air ratio varies with operating conditions but will generally range from 0.4 to 1.6 and is usually about 0.8 to 1.0 lbs. hydrocarbon/lb. $O_2$. Expressed in a slightly different manner the hydrocarbon air ratio for the production of carbon black according to my invention is in the range of 1.5 to 5 times stoichiometric, preferably 2 to 4 times. When the feed stock is paraffinic the hydrocarbon air ratios generally are lower and conversely when the feed stocks contain appreciable amounts of aromatic hydrocarbons the ratios are higher.

The temperatures within the combustion and reaction zones of the process can be varied within wide limits. For example, the chamber temperature may range from 2000 to 3300° F. However, preferred reactor temperatures are from 2400 to 3000° F.

A constriction at a midpoint, that is, at an intermediate location, of the reactor has been found advantageous in many cases, but a smoothly cylindrical reaction zone without such a constriction is also satisfactory.

The rate of cooling water pumped into the reactor jacket depends upon the reaction temperature desired and varies widely. The jacket water is also metered into the core of the reactor at a point at the end of the primary reaction zone to partially quench the reaction. This primary quenching reduces the temperature of the reaction stream to a range of from about 800 to about 1800° F. At this temperature the newly formed carbon black becomes less subject to excessive decomposition reactions but remains responsive to contact with the subsequent oxygen stream.

The partially quenched carbon containing stream then is conducted to the oxidizing chamber where the carbon containing stream is introduced axially and the oxidizing air flow is introduced into the annulus. While such an arrangement is preferred, it has been found that the oxidizing air can be introduced at the axis instead of at the annulus with similarly good results.

The temperature in the oxidizing zone as measured by the temperature of the carbon stream entering the oxidizing chamber has been found critical. Varying the inlet temperature varies the pH of the resulting carbon black product. The lowest pH is obtained at a temperature of about 1500° F. It is noted that this temperature is considerably higher than the oxidizing temperatures used in prior art methods. (The ignition temperature of the carbon black, under the conditions of the invention process, appears to lie between 1500 and 1600° F., see FIGURE 2.) However, the relatively high oxidation temperature, the very short residence time and the composition of the carbon feed stream combine to produce a carbon black product which is particularly suitable for rubber reinforcement. While oxidation chamber residence times of about 0.030 second were employed, the residence time can be varied, depending upon other conditions from 0.005 second to as long as 0.4 second or even 1 second, and still obtain good quality high yield carbon black.

The overall hydrocarbon/oxygen mix ratio for the invention process can range from about 0.20 to about 0.80 and is generally about 0.50 lbs. hydrocarbon/lb. oxygen.

The oxidizing zone is water cooled in a manner similar to that in which the primary reaction chamber is cooled. A portion of the jacket water is metered into the hot core at the end of the oxidation zone to complete the quenching and thus prevent excessive decomposition of product. Care must be taken to provide sufficient quenching fluid for this purpose and yet prevent excessive quench water usage which would interfere with subsequent carbon recovery operation. The condensation of water vapor in the product carbon is to be avoided. A bypass valve is generally provided on the jacket water system so that the portion of the jacket water used to quench the carbon containing stream can be rigidly controlled.

The effluent from the oxidation chamber of the invention process passes through a conventional pressure control valve beyond which the pressure is reduced to about atmospheric. The carbon is then separated from the stream, bagged, and the by-product and residual gases are vented. These latter operations are familiar to those skilled in the art.

While carbon black of some sort can be produced from any hydrocarbon, it has been found that the best carbon black for rubber reinforcement is one that has relatively small particle size.

In order to produce such small particle size grades of carbon black in high yield per pound of feedstock, it is preferable to employ a liquid hydrocarbon feedstock as the source of said carbon black. Said liquid hydrocarbon feedstock may be a petroleum distillate, or a petroleum residual oil, or a coal tar distillate, or a coal tar residual oil, it should have a substantial aromatic content, and may be fed in vapor form if substantially vaporizable, or as an atomized spray of droplets into the furnace. With regard to the use of petroleum oils, the following aromatic streams from an oil refinery are used commercially: (1) recycle gas oil from catalytic or thermal cracking; (2) synthetic tars from catalytic or thermal cracking; (3) cracked residues; and (4) vacuum still overhead streams and tarry residuums therefrom; or (5) aromatic streams recovered by solvent extraction of any of these streams (1) to (4).

From a standpoint of economics it is preferred to use liquid feedstocks having a U.S. Bureau of Mines correlation index (BMCI) of at least 80, preferably over 90 and more preferably over 110. The formula used is as follows:

$$BMCI = \left(\frac{876}{460+F} + \frac{670}{131.5+API} - 4.568\right)100$$

wherein "F" is the boiling point in ° F. at the 50 percent recovery distillation point and "API" is the American Petroleum Institute gravity at 60° F. Also from an economic standpoint the initial boiling point should be at least 170° F., preferably about 400° F. and most preferably above 550° F. It is preferred that the API gravity should be as low as possible, at least less than 25, preferably less than 10, most preferably 5 and below.

The best feedstock preferably has a low carbon residue and a low pentane insoluble content of less than 5 weight percent for petroleum oils and less than 10 weight percent for coal tars.

The oxygen and/or nitrogen content of the feedstock appears to only reduce the yield and not affect the quality. Sulfur is not objectionable in carbon black from a quality standpoint, but unusually large amounts in carbon black can cause corrosion in the carbon black-producing equipment. It is therefore desirbale from a marketing standpoint to use a feedstock with a sulfur content of less than 3 weight percent, preferably less than 1 weight percent.

The ash content should be low, generally below 0.5 weight percent, preferably below 0.2 weight percent, in order to keep the refractory bricks in the carbon black furnace from fluxing, as the ash has little effect at all on the carbon black quality but tends to flux the refractory bricks of the furnace. The viscosity is unimportant except from a mechanical standpoint of difficulties of pumping and spraying.

Of course, virgin crude oil fractions, or aromatic selective solvent extracts therefrom, can be employed when they have the preferred qualities discussed above, but generally they will be found somewhat lacking in some of these preferred qualities, so that while carbon black may be made from them, they are not preferred as feedstocks for carbon black manufacture.

As an example of one preferred residual feedstock, we may employ an atomized spray of a normally liquid hydrocarbon having a hydrogen-to-carbon atomic ratio below 1.5 and preferably in the range of 0.75 to 1.25; a mean molecular weight above 140 and preferably from 225 to 550; an API gravity less than 20 and preferably less than 10; a viscosity low enough to permit handling, but usually above 30 S.U.S. at 210° F.; and a low Conradson carbon residue, which however, may be in excess of 1.5 weight percent, or even in excess of 3 weight percent.

As an example of one preferred distillate feedstock we may employ a recycle gas oil derived from a cracking process and having an API gravity of 16 to 25, an initial boiling point of 400 to 600° F., and an end point of from 600 to 800° F. The carbon residue is generally low, such as 0.21, for example, although the carbon residue is not critical.

The invention may be further illustrated by the following examples.

EXAMPLE I

Our invention was tested in apparatus made as shown in FIGURE 4 and FIGURE 5 in which the reactor was 1 foot by 2 inches and the oxidizer was 2 feet by 2 inches. This apparatus comprises a reactor 41, an inlet cyclone chamber 42, a reactor feed plate 43, a reactor discharge pipe 44, oxidizer tangential section 45, oxidizer feed plate 46, oxidizer 47, and discharge pipe 48.

Reactor 41 includes a cylindrical shell 51, an inner chamber wall 52, shell 51 and wall 52 together defining an annular passage 53. Inlet flange 54 and outlet flange 56 are attached to reactor 41 as shown and are provided with quench fluid inlet passages 57 and outlet passages 58, respectively. There are four inlet passages 57 drilled to enter passage 53 tangentially to cause the quench fluid to have a swirling motion, and a spiral section of tubing 59 is provided to continue the swirling motion throughout passage 53. Four outlet passages 58 are provided and these are drilled radially. Wall 52 includes a reduced diameter portion 61, thus providing a restriction or partial obstruction to the flow therethrough, and a reduced diameter portion 62 at the outlet end which is provided with quench fluid inlets 63. Preferably, a valve 64 is provided to control the flow through outlet passages 58 to thereby regulate the rate of flow of quench fluid through chamber 53. By controlling the inlet pressure of the quench fluid and by regulating the amount which flows through valve 64, the amount which is forced through quench fluid inlet 63 and the amount which is bypassed through valve 64 can be regulated to provide the desired combination of cooling of the wall 52 and the quenching of the reaction products.

In cyclone chamber 42 there is a cylindrical longitudinal passage 66, an inlet passage 67 tangential to passage 66, and a plurality of coolant passages 68. Reactor feed plate 43 is provided with four reactant inlet passages 71 and four coolant inlet passages 72, alternated at equal intervals around the circumference of feed plate 43. Coolant passageways 72 communicate with an annular passage 73 in cyclone chamber 42, and passage 73 in turn communicates with each of passages 68. A feed ring 74 fits into an annular groove 76 in feed ring 43 and provides an annular feed passage 77.

Tangential section 45 is somewhat similar to cyclone chamber 42 except that coolant passages are not provided. An inlet passage 78 enters a cylindrical passage 79 tangentially. Oxidizer feed plate 46 is provided with four equally spaced inlet passages 81 and a feed ring similar to feed ring 74 in feed plate 43 to distribute the oxidizer feed in an annular layer in oxidizer 47.

The construction of oxidizer 47 is substantially the same as the construction of reactor 41 except that, in the apparatus utilized in these tests, the oxidizer section was 2 feet long whereas the reactor section was 1 foot long.

A heavily aromatic reactant obtained by the $SO_2$ extraction of a hydrocarbon oil was used as the feedstock in this example. This reactant had the following characteristics.

Gravity, API _____ 10.9
Refractive index $N_D^{20}$ _____ 1.5898
Distillation, ASTM D86–59, ° F.:
    IBP _____ 465
    5 _____ 558
    10 _____ 582
    20 _____ 604
    30 _____ 650
    40 _____ 636
    50 _____ 652
    60 _____ 666
    70 _____ 688
    80 _____ 722
    90 _____ 750
        Rec. percent _____ 91.0
        Residue percent _____ 9.0
        Loss _____ 0.0
Pentane insoluble, percent _____ 0.08
Bureau of Mines Correlation Index _____ 93.3
Ramsbottom carbon residue, percent _____ 1.78
Carbon content, wt. percent _____ 89.05
Hydrogen content, wt. percent _____ 9.30
Sulfur content, wt. percent _____ 1.5
Water content, wt. percent _____ 0.0321
Pour point, ° F. _____ 50
Viscosity:
    S.U.S. at 100° F. _____ 75.86
    S.U.S. at 210° F. _____ 35.02
BS & W _____ Trace
Aniline point, ° F. _____ 166.4

The essential operating conditions and product tests are reported in Table I below:

*Table I*

1 FT. x 2 IN. ANNULAR HYDROCARBON FEED REACTOR CONDITIONS

[Pressure: 15 atm. Air flow rate: 720 lb./hr. Inlet air temp: 1100° F. Residence time: 0.044 sec.]

| Run No | 1 | 2 | 3 | 4 | 5 | 6 | 7 |
|---|---|---|---|---|---|---|---|
| Oil flow rate, lb./hr | 116 | 114 | 113 | 125 | 123 | 131 | 131 |
| Lb. hydrocarbon/lb. $O_2$ | 0.70 | 0.69 | 0.68 | 0.75 | 0.75 | 0.77 | 0.77 |
| Quench water rate, lb./hr | 465 | 350 | 350 | 295 | 295 | ------ | ------ |

2 FT. x 2 IN. ANNULAR AIR FEED OXIDIZER CONDITIONS

[Pressure: 15 atm. Air flow rate: 360 lb./hr.]

| Inlet gas temp., ° F | 900 | 1,100 | 1,300 | 1,400 | 1,500 | 1,600 | 1,900 |
|---|---|---|---|---|---|---|---|
| Residence time, sec | 0.027 | 0.030 | 0.030 | 0.031 | 0.031 | ------ | 0.030 |
| Overall lb. hydrocarbon/lb. $O_2$ | 0.47 | 0.46 | 0.46 | 0.50 | 0.50 | 0.52 | 0.52 |

| CARBON BLACK CHARACTERISTICS | | | | | | | |
|---|---|---|---|---|---|---|---|
| pH, slurry | 7.1 | 6.5 | 5.4 | 5.1 | 4.4 | 6.0 | 6.8 | [1] 4.5 |
| Yield, lb./gal | 2.6 | 2.4 | 2.8 | 3.0 | 2.8 | 3.5 | 2.5 | ------ |
| Photelometer, percent trans | 97 | 98 | 96 | 96 | 95 | 97 | 100 | ------ |
| Benzene extractable, percent | ------ | ------ | ------ | ------ | 0.75 | ------ | ------ | 0.03 |
| Surface area, m²/g | 62 | 64 | 55 | 41 | 60 | 59 | 50 | 114 |
| Oil absorption, cc./g | 1.20 | 1.24 | 1.17 | 1.22 | 1.26 | 1.23 | 1.27 | 0.90 |
| DPG adsorption | ------ | ------ | ------ | ------ | 30.6 | ------ | ------ | 38.7 |
| Michelin iodine No | ------ | ------ | ------ | ------ | 134 | ------ | ------ | 189 |
| $NaBH_4$ reduction | ------ | ------ | ------ | ------ | 0.014 | ------ | ------ | 0.028 |
| Volatile, percent | ------ | ------ | ------ | ------ | 1.7 | ------ | ------ | 5.1 |
| Ash, percent | ------ | ------ | ------ | ------ | 0.5 | ------ | ------ | 0.04 |
| $H_2$, percent | ------ | ------ | ------ | ------ | 0.34 | ------ | ------ | 0.71 |
| $O_2$, percent | ------ | ------ | ------ | ------ | 0.57 | ------ | ------ | 3.40 |

[1] Commercially available channel carbon black.

As is seen from the data in the preceding table, carbon black is produced with a controllable range of pH acidity. The value of pH of 4.4 obtained in Run 5 compares favorably with the pH of commercial channel black. The product from our novel process is a hybrid material which shows desirable characteristics of both the furnace and the channel processes. It has the ease and efficiency of preparation of the furnace process and the acidity of the channel process. On the other hand the acidity of the material as indicated by low pH and high diphenylguanidine adsorption are apparently not obtained in the same manner in the case of each process. The acidity of the channel black is generally associated with high volatiles and oxygen content due to carbon-oxygen complexes whereas the data show that the acidity of the product from the invention process is obtained while retaining a comparatively low level of volatiles and oxygen content. Thus, the present novel process produces a product which is in itself also novel.

To further evaluate the carbon black produced by this process, it was tested as a rubber reinforcement in a standard rubber recipe which contains the following ingredients in parts by weight per 100 parts Philprene 1000 rubber: 40 carbon black, 3 zinc oxide, 6 BRT #7, 1.75 sulfur, and variable Santocure accelerator. A carbon product produced in an essentially identical manner as Run 5 in the previous table was tested in the above-mentioned formulation together with samples of commercial channel and furnace carbon blacks. The data are seen in Table III.

EXAMPLE II

Several runs using a variation of the invention were carried out. The variation involved the method of introduction of the oxidizing air into the oxidizing zone of the process. The oxidizing air was fed through a pipe such as entry 31 of FIGURE 1, and thus was introduced axially instead of annularly as in Example I. The essential operating data and product examination from these runs are seen in Table II below.

*Table II*

1 FT. x 2 IN. ANNULAR HYDROCARBON FEED REACTOR CONDITIONS

[Pressure: 15 atm. Air flow rate: 720 lb./hr. Inlet air temp: 1,100° F. Residence time: 0.044 sec.]

| Run No | 8 | 9 | 10 |
|---|---|---|---|
| Oil flow rate, lb./hr | 115 | 118 | 119 |
| Lb. hydrocarbon/lb. $O_2$ | 0.70 | 0.72 | 0.72 |
| Quench water rate, lb./hr | 350 | 340 | 288 |

2 FT. x 2 IN. AXIAL AIR FEED OXIDIZER CONDITIONS

[Pressure: 15 atm. Air flow rate: 360 lb./hr.]

| | | | |
|---|---|---|---|
| Inlet gas temp., °F | (1,500) | (1,400) | (1,700) |
| Residence time, sec | 0.029 | 0.030 | 0.031 |
| Overall lb. hydrocarbon/lb. $O_2$ ratio | 0.46 | 0.47 | 0.48 |

CARBON BLACK CHARACTERISTICS

| | | | |
|---|---|---|---|
| pH slurry | 4.4 | 5.6 | 4.1 |
| Yield, lb./gal | 2.7 | 3.3 | 3.1 |
| Photelometer, percent trans | 99 | 100 | 93 |
| Oil absorption | 1.23 | 1.29 | 1.24 |
| Volatiles, percent | 1.98 | 1.71 | 2.86 |
| Ash, percent | 0.47 | 0.18 | 0.10 |
| Benzene extractables, percent | 0.41 | -------- | 0.93 |
| DPG adsorption | 39.20 | -------- | 33.24 |
| Michelin iodine No | 294 | -------- | 286 |
| $NaBH_4$ | .0118 | .0137 | -------- |
| Surface area, m.$^2$ | 61 | -------- | 58 |

The above data clearly show that the invention process utilizing axial air introduction to the oxidizing zone is also capable of producing an acceptable low pH carbon black.

The carbon black prepared as described above was similarly evaluated in rubber. The data are seen in Table III below. The composition and recipe was the same as that described in Example I.

Table III

EVALUATION OF CARBON BLACK IN RUBBER (30 MIN. CURE)

| Run No | 5[1] | 8[2] | 10[2] | Wyex[3] | IRB #1[4] |
|---|---|---|---|---|---|
| Accelerator level, phr | 1.0 | 1.0 | 1.0 | 1.0 | 0.8 |
| 300% modulus, p.s.i | 1,200 | 1,150 | 1,160 | 775 | 975 |
| Tensile, p.s.i | 2,540 | 2,515 | 2,810 | 3,680 | 3,570 |
| Elongation, percent | 520 | 540 | 560 | 710 | 640 |
| Shore hardness (A) | 61 | 61 | 60.5 | 58 | 58.5 |
| $\Delta T$, °F | 55.4 | 54.1 | 55.1 | 60.5 | 62.8 |
| Resilience, percent | 64.6 | 64.6 | 64.5 | 60.7 | 60.7 |
| Compound Mooney, MS 1½ at 212° F | 29 | 26 | 26 | 27 | 26 |
| Extrusion at 250° F., in/min | 38.8 | 38 | 38.2 | 32 | 36.5 |
| Extrustion rating, Garvey | 12− | 11+ | 12− | 10 | 10+ |

AFTER AGING 24 HRS. AT 212° F.

| | | | | | |
|---|---|---|---|---|---|
| Modulus, p.s.i | 1,700 | 1,775 | 1,700 | 1,560 | 1,675 |
| Tensile, p.s.i | 2,000 | 1,910 | 2,040 | 2,835 | 3,200 |
| Elongation, percent | 350 | 310 | 360 | 460 | 470 |
| $\Delta T$, °F | 50.0 | 49.7 | 49.7 | 51.0 | 57.1 |
| Resilience, percent | 70.4 | 70.7 | 71.3 | 67.5 | 66.2 |

[1] Example I product produced with annular air feed in oxidizer.
[2] Example II product produced with axial air feed in oxidizer.
[3] A commercially available channel carbon black.
[4] Industry reference furnace carbon black.

The data indicate that the carbon black produced by our invention process is satisfatcory for rubber reinforcement.

EXAMPLE III

In a reactor and oxidizer system similar to that of Example I, but without the constrictions, the same reactant feed was used to produce an acidic carbon black. The essential operating conditions and product characteristics are shown in Table IV below.

Table IV

REACTOR OPERATING CONDITIONS

| Run Number | 11 | 12 | 13 | 14 |
|---|---|---|---|---|
| Pressure, atmospheres | 15.1 | 15.9 | 15.5 | 16.4 |
| Air flow rate, lbs./hr | 1,080 | 1,080 | 1,087 | 1,053 |
| Inlet air temperature, °F | 1,140 | 1,130 | 1,100 | 1,090 |
| Flow velocity, ft./sec | 34.6 | 32.8 | 33.2 | 30.2 |
| Residence time, milliseconds | 28.9 | 30.5 | 30.2 | 33.1 |
| Oil rate, lbs./hr | 188 | 178 | 180 | 182 |
| Mixture ratio, $HC/O_2$, lb./lb | 0.76 | 0.72 | 0.72 | 0.75 |
| Quench water flow rate, lbs./hr | 310 | 335 | 375 | 335 |

AFTERTREATER OPERATING CONDITIONS

| | | | | |
|---|---|---|---|---|
| Pressure, atmospheres | 15.1 | 15.9 | 15.5 | 16.4 |
| Air flow rate, lbs./hr | 0 | 368 | 212 | 501 |
| Inlet gas temperature, °F | 1,450 | 1,480 | 1,400 | 1,430 |
| Reaction temperature, °F | 1,200 | 1,620 | 1,340 | 2,000 |
| Flow velocity, ft./sec | 62.9 | 75.5 | 71.3 | 75.0 |
| Residence time, milliseconds | 31.8 | 26.5 | 28.1 | 26.6 |
| Over-all mixture ratio, $HC/O_2$, lb./lb | 0.76 | 0.54 | 0.60 | 0.51 |

CARBON BLACK CHARACTERISTICS

| | | | | |
|---|---|---|---|---|
| Photelometer, oil in black | 99 | 96 | 90 | 87 |
| Acidity, pH, slurry | 7.8 | 3.8 | 4.9 | 8.5 |
| Yield, lbs. carbon/gal. oil | 1.9 | 1.4 | 1.5 | -------- |
| Oil absorption | 1.13 | 1.16 | 1.10 | 1.20 |
| Surface area, $N_2$ | -------- | 70 | 71 | -------- |

FIGURE 2 illustrates the variation of carbon black acidity, pH, as a function of oxidizer inlet temperature. It will be seen that the acidity increases steadily with increased oxidizer inlet temperatures until the carbon black ignition temperature is reached at which point there is a sharp decrease in acidity and a continuing decrease with further increases in temperature.

Figure 3:
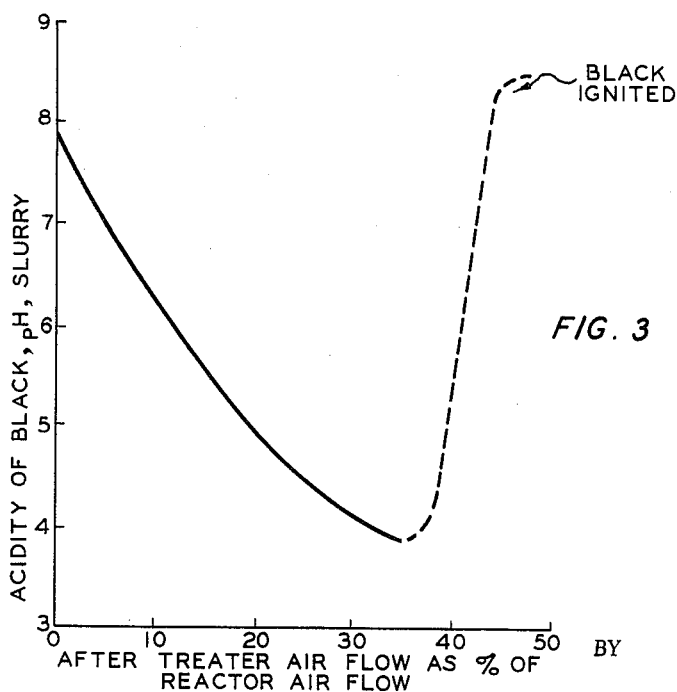
FIGURE 3 is a graph illustrating the variation in pH of the treated black with oxidizer air flow.

FIGURE 3 illustrates the variation of the carbon black acidity, pH, as a function of the oxidizer air flow at constant inlet gas temperature. Here, again, ignition of the treated black appears to be related to a sharp change in direction of the plotted curve. The carbon acidity increases steadily with increased air flow until conditions for ignition at the treating temperature are reached at which point there is a sharp decrease in the acidity of the treated black.

Following are several definitions relating to products and procedures mentioned in the description of our invention:

Santocure—accelerator; N-cyclohexyl-2-benzothiazole sulfenamide; Monsanto Chemical Company, Rubber Chemicals Dept.

Philprene 1000—butadiene-styrene copolymer, emulsion polymerized at approximately 122° F. containing 22.5–24.5 percent bound styrene.

BRT #7—softener and reclaiming oil; refined coal tar product, Sp. G. 1.20–1.25 (25°/25° C.), Engler viscosity 6–9 at 100° C.; Barrett Chemical.

Photelometer—a qualitative measure of the extractable tarry component of carbon black; ASTM D 1618–58T.

Benzene extractables—a quantitative measure of the soluble, tar content of carbon black; the percent weight loss of 1.75 grams carbon black after extraction with hot benzene for 5 hours.

pH—the pH of a suspension of carbon black and water; ASTM D 512–60.

DPG adsorption—the number of microequivalents of diphenylguanidine adsorbed by one gram of carbon black; determined by back titration of benzene solution of diphenylguanidine with standard methanolic HCl using tetrabromophenylsulphonephthalein indicator.

Oil absorption—the volume of oil required to convert a known weight of a black to a stiff paste or coherent ball; ASTM D 281–31.

Surface area—the method using the Brunauer, Emmett and Teller Theory (B.E.T. Method) involving the low temperature adsorption of a monomolecular layer of nitrogen.

Michelin iodine No.—mg. iodine adsorbed by one gram carbon black which has been primarily devolatilized by heating in the absence of air.

$NaBH_4$ reduction—percent hydrogen uptake per gram of carbon black; a measure of quinone type surface groupings.

Volatiles—percent weight loss of dried sample after 7 minutes at 950±20° C. in the absence of air.

Ash—percent weight left after heating the carbon black for 16 hours at 550° C. in the presence of air.

Hydrogen and oxygen—conventional semi-microelemental analysis by combustion method.

Modulus, tensile and elongation, ASTM D 412–51T.
ΔT and permanent set, ASTM D 623–58, method A.
Resilience—Lupke rebound, "Vanderbilt Rubber Handbook," p. 220 (1958).
Shore Hardness—ASTM D 676–58T.
Compounded Mooney—ASTM D 927–57T, Mooney viscometer, small rotor, 1.5 minutes, 212° F. temperature.
Extrusions—No. ½ Royle extruder with Garvey die, as described in Industrial Engineering Chemistry 34, 1309 (1942).

Reasonable variations and modifications are possible within the scope of our invention which sets forth method and apparatus for producing an acidic oil furnace carbon black by a continuous pyrolysis, partial quench and oxidation and an improved carbon black produced thereby.

We claim:

1. A process for producing acidic carbon black which comprises:
   continuously feeding a fluid hydrocarbon reactant into a generally cylindrical zone;
   passing said fuel through said zone in an annular mass adjacent the periphery of said cylindrical zone;
   continuously feeding a oxygen-containing fluid oxidation agent into said zone;
   passing said agent through said zone in a rotating axial core in contact with said reactant;
   maintaining conditions of pressure, and residence time to produce carbon black from said fuel in said cylindrical zone to a temperature in the range of 800 to 1800° F.;
   partially quenching the reaction products from said cylindrical zone by the addition of a fluid quenching agent;
   passing said partially quenched reaction products without further substantial cooling into an oxidizing zone; and
   in said oxidizing zone, contacting said partially quenched reaction products with an oxygen containing fluid oxiding agent to oxidize said reaction product to produce acidic carbon black.

2. A process for producing acidic carbon black which comprises:
   continuously feeding a fluid hydrocarbon reactant into a generally cylindrical reaction zone;
   passing said reactant through said zone in an annular mass adjacent the periphery of said reaction zone;
   continuously feeding a fluid oxidation agent into said zone;
   passing said oxidizing agent through said zone in a rotating axial core in contact with said reactant;
   maintaining conditions of pressure, temperature and residence time to produce carbon black from said fuel;
   partially quenching the reaction products from said reaction zone to a temperature in the range of 800 to 1800° F. by the addition of a fluid quenching agent;
   passing a stream of said partially quenched reaction products without further substantial cooling into an oxidizing zone;
   passing a stream of an oxygen containing fluid oxidizing agent into said oxidizing zone;
   directing one of said streams into an annular, generally cylindrical, longitudinally flowing mass in said oxidizing zone;
   directing the other of said streams as a central spirally rotating axial core through said oxidizing zone; and
   contacting said streams at the interface between said longitudinally flowing axial mass and said spirally rotating axial core to oxidize said reaction product to produce acidic carbon black.

3. A process for producing acidic carbon black which comprises:
   continuously feeding a fluid hydrocarbon reactant into a generally cylindrical reaction zone;
   passing said reactant through said zone in an annular mass adjacent the periphery of said reaction zone;
   continuously feeding a fluid oxidation agent into said reaction zone;
   passing said agent through said oxidation zone in a rotating axial core in contact with said reactant;
   maintaining conditions of pressure, temperature and residence time to produce carbon black from said reactant in said reaction zone;
   partially quenching the reaction products from said reaction zone to a temperature in the range of 800 to 1800° F. by the addition of a fluid quenching agent to a temperature below the ignition temperature of said carbon black;
   feeding said partially quenched reaction products without further substantial cooling into a generally cylindrical oxidation zone;
   continuously passing said partially quenched reaction products through said oxidation zone in a rotating axial core;
   continuously feeding an oxygen containing fluid oxidation agent into said oxidation zone; and
   passing said oxidation agent through said oxidation zone in an annular mass adjacent the periphery of said oxidation zone in contact with said core to oxidize said reaction product to produce acidic carbon black.

4. Means for producing acidic carbon black comprising:
   a generally cylindrical reactor;
   means to feed a fluid hydrocarbon reactant continuously to said reactor;
   means to pass said reactant through said reactor in an annular mass adjacent the periphery of said reactor;
   means to feed a fluid oxidation agent continuously into said reactor;
   flow directing means to pass said agent through said reactor in a rotating axial core in contact with said reactant;
   means to maintain conditions in said reactor to produce carbon black from said reactors, comprising means to maintain a desired pressure, means to maintain a desired temperature, and means to maintain a desired residence time;
   means to partially quench the reaction products from said reactor by the addition of a fluid quenching agent;
   an oxidizing chamber;
   means to pass a stream of said partially quenched reaction products without further substantial cooling into said oxidizing chamber;
   means to pass a stream of a fluid oxidizing agent into said oxidizing chamber;
   means to direct one of said streams in an annular mass adjacent the periphery of said chamber; and
   flow directing means to direct the other of said streams in a rotating axial core in contact with said annular mass to oxidize said reaction product to produce acidic carbon black.

5. Means for producing acidic carbon black comprising:
   a generally cylindrical reactor;
   means to feed a fluid hydrocarbon reactant continuously into said reactor;
   means to direct said reactant through said reactor in an annular mass adjacent the periphery of said reactor;
   means to feed a fluid oxidation agent continuously into said reactor;
   flow directing means to direct said agent through said reactor in a rotating axial core in contact with said reactant;
   an annular chamber surrounding said reactor;
   means to feed a quenching agent into said chamber;
   means to feed at least a portion of said quenching agent from said chamber into said reactor to partially quench the reaction products therein;
   a generally cylindrical oxidation chamber;

means to feed a stream of the partially quenched reaction products without further substantial cooling from said reactor into said chamber;
means to feed a stream of a fluid oxidizing agent into said chamber;
means to direct one of said streams through said chamber in an annular mass adjacent the periphery thereof;
flow directing means to direct the other of said streams through said chamber in a rotating axial core in contact with said annular mass;
an annular chamber surrounding said oxidation chamber;
means to feed a quenching agent into said annular chamber; and
means to inject at least a portion of said quenching agent from said annular chamber into said oxidizing chamber to discontinue the reaction therein when a desired degree of oxidation of said reaction products has been attained.

6. Means for producing acidic carbon black comprising:
a generally cylindrical reactor;
means to feed a fluid hydrocarbon reactant continuously into said reactor;
means to direct said reactant through said reactor in an annular mass adjacent the periphery of said reactor;
means to feed a fluid oxidation agent continuously into said reactor;
flow directing means to direct said agent through said reactor in a rotating axial core in contact with said reactant;
obstruction means in said reactor to cause additional mixing of said fuel and said agent in an intermediate portion of said reactor;
an annular chamber surrounding said reactor;
means to feed a quenching agent into said chamber;
means to feed at least a portion of said quenching agent from said chamber into said reactor to partially quench the reaction products therein;
a generally cylindrical oxidation chamber;
means to feed a stream of the partially quenched reaction products without further substantial cooling from said reactor into said chamber;
means to feed a stream of a fluid oxidizing agent into said chamber;
means to direct one of said streams through said chamber in an annular mass adjacent the periphery thereof;
flow directing means to direct the other of said streams through said chamber in a rotating axial core in contact with said annular mass;
obstruction means in said oxidation chamber to cause additional mixing of said stream in an intermediate portion of said oxidation chamber;
an annular chamber surrounding said oxidation chamber;
means to feed a quenching agent into said annular chamber; and
means to inject at least a portion of said quenching agent from said annular chamber into said oxidizing chamber to discontinue the reaction therein when a desired degree of oxidiation of said reaction products has been attained.

7. Means for producing acidic carbon black comprising:
a generally cylindrical reactor;
means to feed a fluid hydrocarbon reactant continuously into said reactor;
means to direct said reactant through said reactor in an annular mass adjacent the periphery of said reactor;
means to feed a fluid oxidation agent continuously into said reactor;
flow directing means to direct said agent through said reactor in a rotating axial core in contact with said reactant;
obstruction means in said reactor to cause additional mixing of said reactant and said agent in an intermediate portion of said reactor;
an annular chamber surrounding said reactor;
means to feed a quenching agent into said chamber;
means to feed at least a portion of said quenching agent from said chamber into said reactor to partially quench the reaction products therein;
a generally cylindrical oxidation chamber;
means to feed a stream of the partially quenched reaction products without further substantial cooling from said reactor into said chamber;
flow directing means to pass said stream of products through said oxidation zone in a rotating axial core;
means to feed a stream of a fluid oxidizing agent into said chamber;
means to pass said oxidizing agent through said chamber in an annular mass adjacent the periphery of said chamber in contact with said products;
obstruction means in said oxidation chamber to cause additional mixing of said products with said oxidizing agent in an intermediate portion of said chamber;
an annular chamber surrounding said oxidation chamber;
means to feed a quenching agent into said annular chamber; and
means to inject at least a portion of said quenching agent from said annular chamber into said oxidizing chamber to discontinue the reaction therein when a desired degree of oxidation of said reaction products has been attained.

8. A process for producing acidic carbon black which comprises:
continuously feeding a fluid hydrocarbon reactant into a generally cylindrical reaction zone;
passing said reactant thru said zone as an annular mass adjacent the periphery of said reaction zone;
continuously feeding a free oxygen containing fluid oxidation agent into said zone;
passing said free oxygen containing oxidizing agent thru said zone as a rotating axial core in contact with said reactants;
maintaining the pressure within said reaction zone in the range of 8–30 atmospheres;
maintaining the temperature within said reaction zone in the range of 2000–3300° F.;
maintaining the residence time of said reactant in said reaction zone in the range of about 5 to about 400 milliseconds;
partially quenching the reaction products from said reaction zone to a temperature in the range of 800–1800° F. by the addition of a fluid quenching agent;
passing a stream of said partially quenched reaction products without further substantial cooling into an oxidizing zone;
passing a stream of an oxygen containing fluid oxidizing agent into said oxidizing zone;
directing one of said streams as an annular, generally cylindrical, longitudinally flowing mass in said oxidizing zone;
directing the other of said streams as a central spirally rotating axial core thru said oxidizing zone;
maintaining the pressure in said oxidizing zone in the range of 8–30 atmospheres;
maintaining the residence time in said oxidizing zone in the range of 0.005 to 1 second; and
contacting said streams at the interface between said longitudinally flowing axial mass and said spirally rotating axial core to oxidize said reaction product to produce acidic carbon black.

9. The process of claim 8 wherein said stream of partially quenched reaction products is passed thru said oxidizing zone as a central spirally rotating axial core and said stream of oxidizing agent is passed thru said oxidizing zone as an annular, generally cylindrical, longitudinally flowing mass.

10. The process of claim 8 wherein said stream of partially quenched reaction products is passed through said oxidizing zone as an annular, generally cylindrical, longitudinally flowing mass and said stream of oxidizing agent is passed thru said oxidizing zone as a central spirally rotating axial core.

References Cited by the Examiner

UNITED STATES PATENTS

| | | | |
|---|---|---|---|
| 2,144,971 | 1/1939 | Heller et al. | 23—209.8 |
| 2,657,117 | 10/1953 | Sperberg | 23—209.6 |
| 2,682,448 | 6/1954 | Cines | 23—209.1 |
| 2,790,838 | 4/1957 | Schrader | 260—679 |
| 2,851,337 | 9/1958 | Heller | 23—209.4 |
| 2,961,300 | 11/1960 | Dollinger | 23—209.4 |
| 2,967,762 | 1/1961 | Krejci | 23—209.6 |
| 2,976,128 | 3/1961 | Latham et al. | 23—209.6 |
| 2,985,698 | 5/1961 | Pechtold et al. | 260—679 |
| 3,009,784 | 11/1961 | Krejci | 23—209.4 |

FOREIGN PATENTS

| | | |
|---|---|---|
| 455,047 | 3/1949 | Canada. |
| 848,419 | 9/1960 | Great Britain. |

OSCAR R. VERTIZ, *Primary Examiner.*

MAURICE A. BRINDISI, *Examiner.*

S. R. BRESCH, E. J. MEROS, *Assistant Examiners.*